United States Patent
Traenklein

(10) Patent No.: US 10,010,972 B2
(45) Date of Patent: Jul. 3, 2018

(54) MACHINE TOOL COMPRISING A PUNCHING DEVICE AND A LASER MACHINING DEVICE

(71) Applicant: TRUMPF Werkzeugmaschinen GmbH + Co. KG, Ditzingen (DE)

(72) Inventor: Dennis Traenklein, Nufringen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 165 days.

(21) Appl. No.: 15/235,416

(22) Filed: Aug. 12, 2016

(65) Prior Publication Data

US 2017/0043430 A1 Feb. 16, 2017

(30) Foreign Application Priority Data

Aug. 13, 2015 (EP) .................................... 15180878

(51) Int. Cl.
| | |
|---|---|
| *B26F 1/38* | (2006.01) |
| *B23K 26/00* | (2014.01) |
| *B23Q 11/00* | (2006.01) |
| *B23K 37/02* | (2006.01) |
| *B23K 26/08* | (2014.01) |
| *B23K 37/04* | (2006.01) |
| *B23K 101/18* | (2006.01) |

(52) U.S. Cl.
CPC ...... *B23K 26/0093* (2013.01); *B23K 26/0869* (2013.01); *B23K 37/0241* (2013.01); *B23K 37/0461* (2013.01); *B23Q 11/0032* (2013.01); *B26F 1/38* (2013.01); *B23K 2201/18* (2013.01)

(58) Field of Classification Search
CPC .... B23K 26/0093; B26F 1/38; B23Q 11/0032

USPC .......................................... 219/121.63–121.72
See application file for complete search history.

(56) References Cited

U.S. PATENT DOCUMENTS

| | | | | |
|---|---|---|---|---|
| 4,833,292 A * | 5/1989 | Katayama | .......... | B23K 26/0093 219/121.6 |
| 4,889,968 A * | 12/1989 | Miyama | .............. | B21D 43/282 219/121.7 |
| 6,144,009 A * | 11/2000 | Ulrich | ................ | B23K 26/0093 219/121.67 |

FOREIGN PATENT DOCUMENTS

| | | |
|---|---|---|
| EP | 0412584 B1 | 9/1993 |
| EP | 2468449 A1 | 6/2012 |
| JP | S61154781 A | 7/1986 |

(Continued)

*Primary Examiner* — Samuel M Heinrich
(74) *Attorney, Agent, or Firm* — Fish & Richardson P.C.

(57) ABSTRACT

A machine tool for machining workpieces comprising a support structure, a punching device mounted on the support structure, and a laser machining device mounted on the support structure. The machine tool includes a suspension device provided between the punching device and the laser machining device to reduce the laser machining device from being stimulated to move unintentionally due to the operation of the punching device. The suspension device has a spring rate which can be adjusted by a laser positioning device. The laser positioning device can move the laser machining device relative to the workpiece into a functional position and also into a position remote from the functional position. The spring rate of the suspension device is adjusted such that the functional position of the laser machining device is assigned a higher spring rate than that assigned to the position of the laser machining device remote from the functional position.

10 Claims, 2 Drawing Sheets

(56) References Cited

FOREIGN PATENT DOCUMENTS

WO     WO2014196478   A1    12/2014

\* cited by examiner

MACHINE TOOL COMPRISING A PUNCHING DEVICE AND A LASER MACHINING DEVICE

CROSS-REFERENCE TO RELATED APPLICATION

This application claims priority under 35 U.S.C. § 119(a) to European Application No. 15 180 878.9, filed on Aug. 13, 2015, the entire contents of which are incorporated herein by reference.

TECHNICAL FIELD

The invention relates to a machine tools for machining workpieces, such as metal sheets.

BACKGROUND

On certain combination punching and laser machines, the punching and the laser machining of workpieces are carried out successively. During the punching operation, the laser machining device is moved by a laser positioning device into a parked position away from the punched workpiece. For laser machining the workpiece, the laser machining device is transferred into a functional position near the workpiece by the laser positioning device.

Due to the punching device and the laser machining device both being fastened to the machine frame, there is a risk that shocks and impacts occurring during the punching operation of the machine tool will be transferred to the laser machining device arranged in the parked position. In order to prevent the laser machining device from being affected by punching of the workpiece, special design precautions are taken in the prior art.

On a machine tool, which is provided by TRUMPF (address: Johann-Maus-Straße 2, 71254 Ditzingen, Germany) under the name "TruMatic® 6000 fiber", the laser machining device is mounted together with the laser positioning device on a base plate which is in turn, in the parked position of the laser machining device, resiliently mounted on the machine frame which is also equipped with the punching device. The suspension of the TruMatic® 6000 fiber provides an advanced system that ensures that the shocks and impacts associated with the punching operation of the machine are not transferred unfiltered to the laser machining device. If a workpiece is being laser-machined and the laser machining device is thus positioned in the functional position near the workpiece, the resilient mounting of the base plate equipped with the laser machining device is deactivated by means of a device provided solely for this purpose and the laser machining device is rigidly connected to the machine frame of the generic machine tool by means of the base plate. As a result of the rigid connection of the laser machining device to the machine frame, the workpiece can be laser-machined with the required precision.

SUMMARY

Various embodiments disclosed herein provide machine tools for machining workpieces. The machine tool includes a support structure. The machine tool includes a punching device mounted on the support structure and configured to punch an aperture in a workpiece. The machine tool includes a laser machining device mounted on the support structure. The laser machining device is configured to laser-machine the workpiece. The laser machining device and the punching device are connected to one another by the support structure. The machine tool includes a laser positioning device configured to position the laser machining device with respect to the workpiece. The laser positioning device is configured to move the laser machining device by an activation movement into a functional position for laser machining. The laser positioning device is configured to move the laser machining device into a position remote from the functional position. The machine tool includes a suspension device having a spring rate. The suspension device is configured to support the laser machining device on the support structure so as to reduce movement of the laser machining device caused by an operation of the punching device. The laser positioning device is configured to adjust the spring rate of the suspension device such that the suspension device has a higher spring rate when the laser machining device is positioned in the functional position than the spring rate of the suspension device when the laser machining device is positioned in the position remote from the functional position.

Accordingly, in the case of various embodiments of the invention, the laser positioning device is used not only to transfer the laser machining device into the functional position and into a position remote from the functional position, in particular a position remote from the workpiece, for example into a parked position, but also to adapt the mounting of the laser machining device on the support structure to variable operating situations. If the laser machining device is in the functional position and if the laser machining device is intended to be used for laser machining a workpiece, the laser positioning device ensures a high spring rate of the suspension device by means of which the laser machining device is connected to the support structure of the machine tool according to the invention. In certain implementations, the laser machining device transferred into the functional position can be rigidly connected to the support structure by means of the laser positioning device. The laser machining, for example laser cutting or laser welding the relevant workpiece, can be carried out with high precision due to the increased spring rate of the suspension device. If the laser machining device is not used for machining workpieces and the machine tool according to various embodiment the invention is in the punching mode, the spring rate of the suspension device is reduced by means of the laser positioning device. As a result, the suspension device is capable of absorbing shocks and impacts occurring due to the punching operation, and thereby preventing adverse effects of the punching operation on the laser machining device. The dual function consequently carried out by the laser positioning device advantageously results in a simple structural design of the machine tool according to embodiments of the invention.

In particular embodiments of the invention, the spring rate of the suspension device provided for mounting the laser machining device is modified by the laser positioning device changing the length of a spring of the suspension device. In a certain spring design, this measure provides a simple option for varying the "rigidity" of the mounting of the laser machining device on the support structure of the machine tool according to the invention. In particular embodiments the spring includes, for example, helical springs, leaf springs and disc spring. The springs can include elastomer springs and pneumatic springs.

In particular embodiments of the invention, a support structure-side device stop of the machine tool according to the invention ensures substantially zero-backlash support of the laser machining device, moved into the functional position, in the direction of the activation movement. In the opposite direction, the laser machining device is supported on the support structure by means of the spring of the suspension device, the spring of the suspension device being compressed by means of the laser positioning device. Overall, this results in a substantially rigid mounting of the laser machining device, both in the direction of the activation movement of the laser machining device and in the opposite direction, as is essential for carrying out high-precision laser machining of a workpiece.

Certain embodiments of the invention relates to the detailed structural implementation of the mounting system. The laser positioning device can include a support structure-side drive element that is assigned to the support structure of the machine tool and a device-side drive element that is connected for movement to the laser machining device and that is movable relative to the support structure. The support structure-side drive element of the laser positioning device is supported on the support structure of the machine tool according to embodiments of the invention in the opposite direction to the activation movement of the laser machining device and is therefore resiliently mounted in said direction when the laser machining device is in a position remote from the functional position. The resilient mounting of the support structure-side drive element causes a corresponding resilient mounting of the device-side drive element that interacts with the support structure-side drive element and, via said device-side drive element, also causes a corresponding resilient mounting of the laser machining device that is connected for movement to the device-side drive element. Proceeding from the position remote from the functional position, the laser machining device is transferred into the functional position by means of an activation movement, as a result of a movement of the device-side drive element relative to the support structure-side drive element. In the functional position, the laser machining device is supported in the direction of the activation movement by means of the support structure-side device stop and is therefore prevented from moving further in the direction of the activation movement. Continued actuation of the laser positioning device now leads to the support structure-side drive element being displaced relative to the device-side drive element in the opposite direction to the drive movement of the laser machining device, and the spring of the suspension device thus compressing and the spring rate of the suspension device increasing, which suspension device is provided for supporting the laser machining device in the opposite direction to the activation movement of the laser machining device.

Linear movements of the device-side drive element and of the support structure-side drive element of the laser positioning device along a laser positioning axis can be achieved, according to particular embodiments. For example, in certain embodiments, the laser machining device is configured to be moved along a laser positioning axis via the laser positioning device into the functional position by the activation movement and also, in the opposite direction to the activation movement, into the position remote from the functional position. The device-side drive element of the laser positioning device is configured to move relative to the support structure-side drive element of the laser positioning device. The support structure-side drive element and, via the support structure-side drive element, the device-side drive element, and the laser machining device are supported on the support structure along the laser positioning axis in the opposite direction to the activation movement of the laser machining device by the spring of the suspension device. The support structure-side drive element is configured to be moved relative to the device-side drive element along the laser positioning axis in the opposite direction to the activation movement so as to compress the spring of the suspension device, with the laser machining device supported in the functional position on the support structure-side device stop.

In particular embodiments, of the machine tool, a laser positioning device provided as a piston-cylinder unit. In such embodiments, the cylinder of the piston-cylinder unit is provided as the device-side drive element and the piston of the piston-cylinder unit is provided as the support structure-side drive element of the laser positioning device.

In particular embodiments, of the machine tool the laser positioning device of the machine tool is provided in the form of a pneumatic piston-cylinder unit. Owing to the compressibility of the compressed air present in the cylinder of the pneumatic piston-cylinder unit, the piston can be resiliently moved inside the cylinder. In combination with a spring of the suspension device for the laser machining device, a pneumatic piston-cylinder unit forms a spring-damper system.

In particular embodiments, the laser machining device is resiliently mounted on the support structure of the machine tool both in the direction of the activation movement and in the opposite direction to the activation movement. Associated therewith is a comprehensive protection of the laser machining device against impairment by shocks and impacts that occur during the punching operation of the machine tool.

In the interest of a structure having a particularly simple design, it is provided in the case of the machine tool according to the invention for the same component to support the laser machining device positioned in the functional position in the direction of the activation movement and to support the spring of the suspension device for the laser machining device in the opposite direction.

In particular embodiments of the machine tool, the support structure, on which both the punching device and the laser machining device of the machine tool are mounted, can move conjointly with the punching device and the laser machining device in the transverse direction of the activation movement, in particular in a direction perpendicular to a laser positioning axis. Travel movements of this kind can be used for positioning the punching device and/or the laser machining device relative to a workpiece to be machined, but can also be carried out as working movements. In any case, the same drive can be used to both produce the movements of the punching device and to produce the movements of the laser machining device. As a result, machine tools according to embodiments of the invention are particularly energy and cost-efficient.

The invention will be described in more detail in the following with respect to schematic drawings given by way of example, in which:

DETAILED DESCRIPTION

Figure 1:
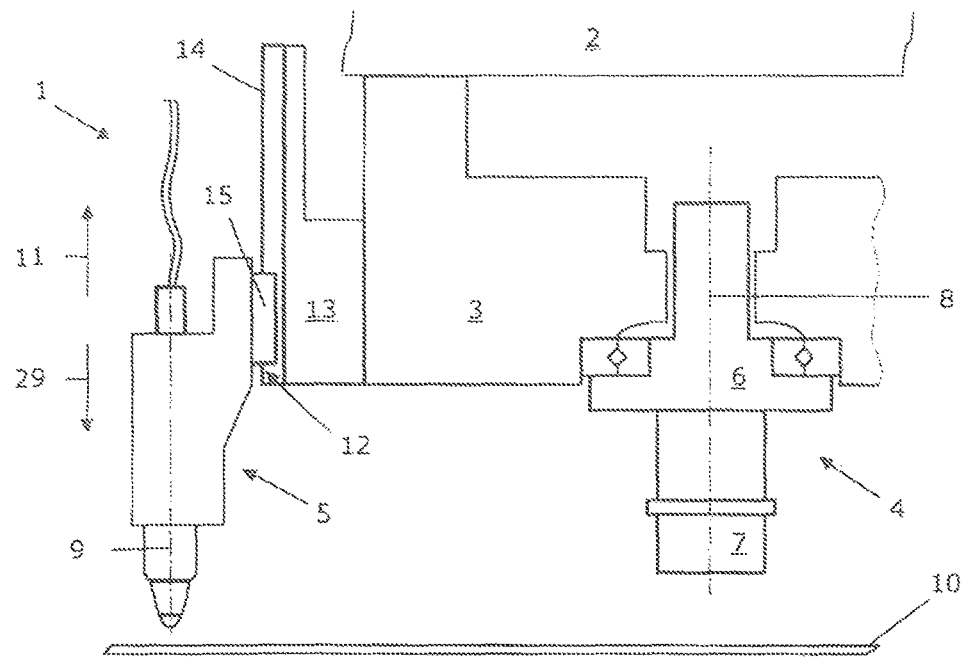
FIG. 1 is a partial view of a punch-laser combination machine comprising a punching device and a laser machining device on a common support structure.

According to FIG. 1, a machine tool 1 designed as a punch-laser combination machine comprises a machine frame 2. A support structure 3 can be moved on the machine frame 2 perpendicularly to the plane of the drawing of FIG. 1. The support structure 3 mounts a punching device 4 and a laser machining device in the form of a laser cutting head 5. Both the punching device 4 and the laser cutting head 5 are conventionally designed.

Figure 3:
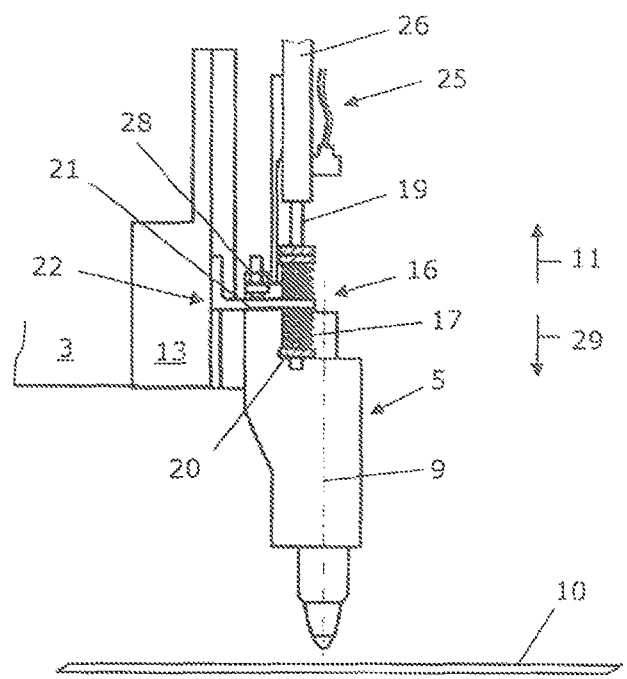
FIG. 3 shows the laser machining device according to FIGS. 1 and 2 in a functional position on the support structure when the suspension device is functional.
Figure 4:
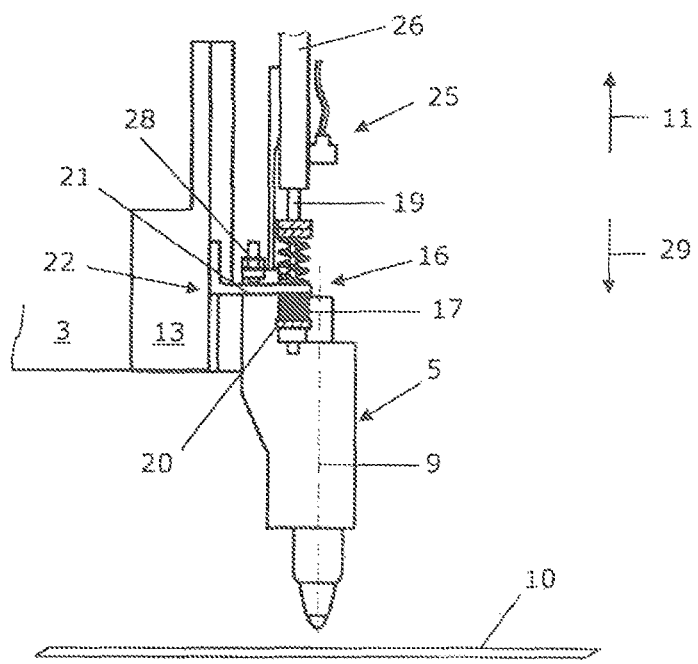
FIG. 4 shows the laser machining device according to FIGS. 1 to 3 in the functional position on the support structure when the suspension device is deactivated.

The punching device 4 comprises, a ram 6 which has a tool holder 7 in which a punch can be introduced. By means of drive devices (not shown in detail), the ram 6, together with the tool holder 7 and a punch introduced into the tool holder 7, can be moved along a punch-stroke axis 8 by a working stroke and by a return stroke following the working stroke, and can be rotationally adjusted about the punch-stroke axis 8. The laser cutting head 5 can be positioned along a laser positioning axis 9 in the manner described in more detail in the following. Both the punching device 4 and the laser cutting head 5 of the machine tool 1 are used for machining a metal sheet 10, which is indicated in FIGS. 1, 3 and 4 and is supported during machining by a conventional workpiece support (not shown for reasons of simplicity).

In FIG. 1, the laser cutting head 5 is moved along the laser positioning axis 9 into a functional position near the workpiece. If the laser cutting head 5 is in the functional position, the metal sheet 10 can be cut by a laser beam directed from the laser cutting head 5 onto the metal sheet 10. Relative movements of the laser cutting head 5 and metal sheet 10 that are to be carried out for cutting metal sheets are produced, on the one hand, by movements of the support structure 3, which mounts the laser cutting head 5, that are perpendicular to the plane of the drawing of FIG. 1 and, on the other hand, by horizontal movements of the metal sheet 10 that are perpendicular to the movements of the support structure 3, a superimposition of the movements carried out in both axial directions being possible. In order that the metal sheet 10 can be cut with the precision required, the laser cutting head 5 positioned in the functional position must be connected as rigidly as possible to the support structure 3 which is, in turn, guided on the machine frame 2 so as to have zero backlash.

The punching device 4 is shutdown during the cutting operation of the machine tool 1. In this case, as can be seen in FIG. 1, the ram 6, together with the tool holder 7, is withdrawn from the metal sheet 10 along the punch-stroke axis 8.

Figure 2:
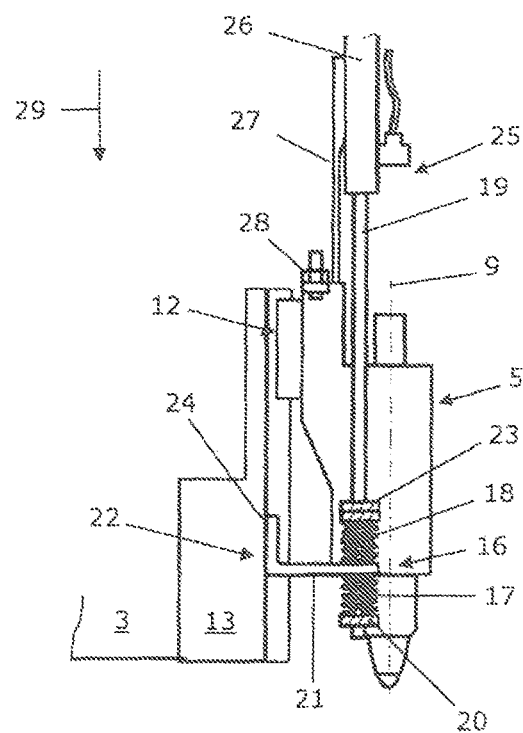
FIG. 2 shows the laser machining device according to FIG. 1 in a parked position on the support structure and comprising a functional suspension device between the support structure and the laser machining device.

Conversely, during the punching operation of the machine tool 1, the laser cutting head 5 is raised, relative to the functional position thereof shown in FIG. 1, along the laser positioning axis 9 by means of a retracting movement relative to the metal sheet 10 and into a parked position. The direction of the retracting movement of the laser cutting head 5 is illustrated in FIG. 1 by an arrow 11. FIG. 2 shows the laser cutting head 5 in the parked position remote from the workpiece. The metal sheet 10 is not shown in FIG. 2. There is a gap between the laser cutting head 5 positioned in the parked position and the top of the metal sheet 10, which gap is dimensioned such that the metal sheet 10 can carry out the movements required for the punching without colliding with the laser cutting head 5.

When moving into the parked position and into the functional position, the laser cutting head 5 is guided, by means of a linear guide 12, along the laser positioning axis 9 on a base plate 13 that is rigidly connected to the support structure 3. For this purpose, the linear guide 12 comprises a guide rail 14 on the base plate 13 and a guide carriage 15 on the laser cutting head 5, which guide carriage is arranged on the guide rail 14.

Impacts and shocks, which travel from the punching device 4 via the support structure 3 and the base plate 13 to the laser cutting head 5, occur during the punching operation of the machine tool 1.

In order to prevent the laser cutting head 5 from being affected by punching the metal sheet 10 and by the shocks and impacts associated therewith, a suspension device 16 is provided between the punching device 4 and the laser cutting head 5, in particular between the base plate 13 and the laser cutting head 5.

According to FIG. 2, the suspension device 16 comprises a lower spring 17 and an upper spring 18. In the example shown, both the lower spring 17 and the upper spring 18 are designed as helical springs. The spring rate of the upper spring 18 of the suspension device 16 is selected such that the upper spring 18 is only partially compressed under the action of masses, which load said spring in the direction of gravity.

Both springs 17, 18 are positioned on a piston rod 19, the lower spring 17 being pre-tensioned between a lower spring brace 20 connected to the piston rod 19 and the lower face of a horizontal leg 21 of an brace angle bracket 22, and the upper spring 18 being pre-tensioned between an upper spring brace 23 on the piston rod 19 and the upper face of the horizontal leg 21 of the brace angle bracket 22. A vertical leg 24 of the brace angle bracket 22 is rigidly connected to the base plate 13. The piston rod 19 passes through the horizontal leg 21 of the brace angle bracket 22 such that longitudinal movements of the piston rod 19 relative to the brace angle bracket 22 are possible.

The piston rod 19 is part of a piston-cylinder unit 25 provided as a laser positioning device, which unit is operated by compressed air in the example shown. The piston-cylinder unit 25 further comprises a cylinder 26 as a device-side drive element that is associated with the laser cutting head 5, which cylinder, like the piston rod 19, extends in parallel with the laser positioning axis 9 and which guides a piston on its inside along the laser positioning axis 9, which piston is attached to the piston rod 19 and is hidden in the drawings. The piston of the piston-cylinder unit 25 forms a support structure-side drive element that is associated with the support structure 3.

The cylinder 26 of the piston-cylinder unit 25 is rigidly connected to the laser cutting head 5 by means of a connecting rod 27. Near the base of the connecting rod 27, the laser cutting head 5 is equipped with a positioning stop 28 that projects towards the viewer when looking at FIG. 2.

In FIG. 2, the suspension device 16 is in the initial state with the laser cutting head 5 in the parked position. Both the lower spring 17 and the upper spring 18 have a relatively low spring rate. Shocks and impacts occurring during the punching operation of the machine tool 1, which travel from the punching device 4 to the brace angle bracket 22 attached to the base plate 13, are therefore transferred relatively smoothly to the piston rod 19 of the piston-cylinder unit 25, by means of the springs 17, 18 which are supported on the horizontal leg 21 of the brace angle bracket 22, along the laser positioning axis 9. Since the compressed air present inside the cylinder 26 of the piston-cylinder unit 25 can be compressed, the piston-cylinder unit 25 can damp oscillations of the springs 17, 18, occurring as a result of the punching operation, in the manner of a shock absorber. The machining-induced shocks and impacts consequently arrive at most in a highly filtered manner at the laser cutting head 5, which head optionally carries out compensatory movements along the laser positioning axis 9, during which the laser cutting head 5 is guided on the base plate 13 by means of the guide carriage 15 that resonates with the laser cutting head 5 and by means of the guide rail 14 of the linear guide 12 fixed to the support structure. In particular, damage to the laser cutting head 5 and/or an undesired shift of optical elements provided on the laser cutting head 5 are effectively prevented in this manner by the suspension device 16.

If a punching process has finished and the metal sheet 10 is intended to be cut by means of the laser cutting head 5, the punching device 4 is withdrawn from the metal sheet 10 into the position according to FIG. 1, and the laser cutting head is lowered, by means of the piston-cylinder unit 25, out of the parked position according to FIG. 2 into the functional position by means of an activation movement along the laser positioning axis 9. The direction of the activation movement of the laser cutting head 5 is shown in FIG. 2 by an arrow 29.

If the piston-cylinder unit 25 is actuated to produce an activation movement of the laser cutting head 5, the cylinder 26 of the piston-cylinder unit 25 moves downwards relative to the piston rod 19 and to the piston guided inside the cylinder 26 along the laser positioning axis 9. Together with the cylinder 26, the laser cutting head 5 connected thereto lowers by means of an activation movement along the laser positioning axis 9. The suspension device 16 remains at first in the initial state. During the activation movement, the laser cutting head 5 is also guided by the linear guide 12 along the laser positioning axis 9.

The activation movement of the laser cutting head 5 ends and the functional position of the laser cutting head 5 is reached as soon as the positioning stop 28 attached to the laser cutting head 5 strikes the brace angle bracket 22 acting as a support structure-side device stop, in particular strikes the horizontal leg 21 thereof, and the conditions according to FIG. 3 thus result. The laser cutting head 5 is still resiliently supported on the brace angle bracket 22 used as a support structure-side spring brace, and thus on the support structure 3 of the machine tool 1, by means of the lower spring 17 of the suspension device 16 in the opposite direction (illustrated by the arrow 11) to the activation movement of the laser cutting head 5.

Due to the support of the laser cutting head 5 by the brace angle bracket 22 acting in the direction 29 of the activation movement, continued actuation of the piston-cylinder unit 25 does not result in further lowering of the laser cutting head 5, but rather, with the laser cutting head 5 remaining in the functional position, results in the piston rod 19 entering further into the cylinder 26 of the piston-cylinder unit 25 and the piston correspondingly moving inside the cylinder 26 relative thereto in the opposite direction 11 to the activation movement of the laser cutting head 5. As a result, the lower spring 17, which is pre-tensioned between the lower face of the horizontal leg 21 of the brace angle bracket 22 on the one hand and the lower spring brace 20 on the piston rod 19 on the other hand, is compressed until the coils of the lower spring 17 lie tightly packed one on top of the other and therefore form a body that is rigid along the laser positioning axis 9 (FIG. 4).

The laser cutting head 5 is thus mounted on the brace angle bracket 22 so as to have zero backlash along the laser positioning axis 9 and, by means of said brace angle bracket and the base plate 13, is mounted on the support structure 3 and the machine frame 2 of the machine tool 1. Consequently, the metal sheet 10 can now be cut in an extremely precise manner using the laser cutting head 5.

If cutting the metal sheet has been completed and if further punching is to follow, the piston-cylinder unit 25 is actuated such that first the piston rod 19 moves out of the cylinder 26, which retains its position along the laser positioning axis, the lower spring 17 thus being extended (FIG. 3), before the cylinder 26 moves upwards, together with the laser cutting head 5, along the piston rod 19, and thus transfers the laser cutting head 5 into the parked position remote from the workpiece (FIG. 2).

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for machining workpieces, the machine tool comprising:
   a support structure;
   a punching device mounted on the support structure and configured to punch an aperture in a workpiece;
   a laser machining device mounted on the support structure and configured to laser-machine the workpiece, the laser machining device and the punching device connected to one another by the support structure;
   a laser positioning device configured to position the laser machining device with respect to the workpiece, the laser positioning device configured to move the laser machining device by an activation movement into a functional position for laser machining and configured to move the laser machining device into a position remote from the functional position; and
   a suspension device having a spring rate, the suspension device configured to support the laser machining device on the support structure so as to reduce movement of the laser machining device caused by an operation of the punching device,
   wherein the laser positioning device is configured to adjust the spring rate of the suspension device such that the suspension device has a higher spring rate when the laser machining device is positioned in the functional position than the spring rate of the suspension device when the laser machining device is positioned in the position remote from the functional position.

2. The machine tool of claim 1, wherein the suspension device comprises a spring to support the laser machining device on the support structure, wherein the spring has a spring length in a direction in which the laser machining device is supported by the suspension device, wherein the spring rate of the suspension device is configured to be adjusted by the laser positioning device by a change of the spring length of the spring such that the spring length is reduced in the functional position of the laser machining device relative to the spring length in the position of the laser machining device that is remote from the functional position, whereby the spring of the suspension device is compressed in the functional position of the laser machining device.

3. The machine tool of claim 2, wherein a support structure-side device stop which acts in the direction of the activation movement is provided for the laser machining device, on which stop the laser machining device positioned in the functional position is supported in the direction of the activation movement, in that the laser machining device is supported on a support structure-side spring brace in the opposite direction to the activation movement by means of the spring of the suspension device, and in that, when the laser machining device is supported on the support structure-side device stop in the direction of the activation movement in the functional position, the spring of the suspension device is compressed by means of the laser positioning device.

4. The machine tool of claim 3, wherein the laser positioning device comprises a support structure-side drive element which is assigned to the support structure, and a device-side drive element which is connected for movement to the laser machining device, which can be driven, and which interacts with the support structure-side drive element, it being possible to move the device-side drive element of the laser positioning device relative to the support structure-side drive element of the laser positioning device, and the laser machining device thus being movable to perform the activation movement, the support structure-side drive element of the laser positioning device and, by means of said element, the device-side drive element and the laser machining device, being supported on the support structure in the opposite direction to the activation movement of the laser machining device by means of the spring of the suspension device, it being possible, with the laser machining device supported in the functional position on the support structure-side device stop in the direction of the activation movement, to move the support structure-side drive element relative to the device-side drive element in the opposite direction to the activation movement so as to compress the spring of the suspension device.

5. The machine tool of claim 4, wherein the laser machining device is configured to be moved along a laser positioning axis via the laser positioning device into the functional position by the activation movement and also, in the opposite direction to the activation movement, into the position remote from the functional position, wherein the device-side drive element of the laser positioning device is configured to move relative to the support structure-side drive element of the laser positioning device, wherein the support structure-side drive element and, via the support structure-side drive element, the device-side drive element, and the laser machining device being supported on the support structure along the laser positioning axis in the opposite direction to the activation movement of the laser machining device by the spring of the suspension device, and wherein the support structure-side drive element is configured to be moved relative to the device-side drive element along the laser positioning axis in the opposite direction to the activation movement so as to compress the spring of the suspension device, with the laser machining device supported in the functional position on the support structure-side device stop.

6. The machine tool of claim 5, wherein the laser positioning device is configured as a piston-cylinder unit, wherein a cylinder of the piston-cylinder unit extends along the laser positioning axis and is configured as the device-side drive element, and a piston of the piston-cylinder unit that is movably guided in the cylinder along the laser positioning axis is configured as the support structure-side drive element of the piston-cylinder unit.

7. The machine tool of claim 6, wherein the piston-cylinder unit is designed as a pneumatic piston-cylinder unit.

8. The machine tool of claim 4, wherein the support structure-side drive element, the device-side drive element via the support structure-side drive element, and the laser machining device are supported on the support structure in the direction of the activation movement of the laser machining device by an additional spring of the suspension device.

9. The machine tool of claim 3, wherein the support structure-side device stop for the laser machining device on the side remote from the side of the support of the laser machining device forms the support structure-side spring brace on which the spring of the suspension device is supported in the opposite direction to the activation movement of the laser machining device.

10. The machine tool of claim 1, wherein the support structure is configured to move conjointly with the punching device and with the laser machining device on a machine frame of the machine tool in a direction transverse to a direction of the activation movement of the laser machining device.

* * * * *